(12) United States Patent
Watarai (10) Patent No.: US 9,463,358 B2
(45) Date of Patent: Oct. 11, 2016

(54) PEDALING STATE DETECTING APPARATUS

(71) Applicant: Shimano Inc., Sakai, Osaka (JP)

(72) Inventor: Etsuyoshi Watarai, Osaka (JP)

(73) Assignee: Shimano Inc., Osaka (JP)

(*) Notice: Subject to any disclaimer, the term of this patent is extended or adjusted under 35 U.S.C. 154(b) by 189 days.

(21) Appl. No.: 14/259,240

(22) Filed: Apr. 23, 2014

(65) Prior Publication Data

US 2015/0306458 A1    Oct. 29, 2015

(51) Int. Cl.
| | |
|---|---|
| A63B 69/16 | (2006.01) |
| G08B 6/00 | (2006.01) |
| A63B 24/00 | (2006.01) |
| B62J 99/00 | (2009.01) |

(52) U.S. Cl.
CPC .......... *A63B 24/0062* (2013.01); *A63B 69/16* (2013.01); *B62J 99/00* (2013.01); *G08B 6/00* (2013.01); *B62J 2099/008* (2013.01); *B62J 2099/0013* (2013.01); *B62J 2300/002* (2013.01)

(58) Field of Classification Search
CPC .... B62J 99/00; B62J 2099/0026; B62J 6/04; B62J 6/005; B62J 2099/0013; B62J 2099/008; B62J 2300/002; G01C 22/002; A63B 24/0062; A63B 69/16; G08B 6/00
See application file for complete search history.

(56) References Cited

U.S. PATENT DOCUMENTS

| | | | |
|---|---|---|---|
| 5,027,303 A | 6/1991 | Witte | |
| 7,516,677 B2 | 4/2009 | Watarai et al. | |
| 7,585,257 B2 | 9/2009 | Miyamaru et al. | |
| 7,806,006 B2 | 10/2010 | Phillips et al. | |
| 7,861,599 B2 | 1/2011 | Meggiolan | |
| 8,006,574 B2 | 8/2011 | Meyer | |
| 8,065,926 B2 | 11/2011 | Meyer | |
| 2005/0178210 A1* | 8/2005 | Lanham | B62J 99/00 73/818 |
| 2007/0099766 A1* | 5/2007 | Pyles | A63B 22/0605 482/57 |
| 2007/0145709 A1 | 6/2007 | Matsumoto | |
| 2007/0261515 A1 | 11/2007 | Jones | |
| 2010/0263468 A1 | 10/2010 | Fisher et al. | |
| 2012/0017701 A1 | 1/2012 | Meyer | |
| 2012/0330572 A1* | 12/2012 | Longman | G01L 3/247 702/44 |
| 2013/0019700 A1* | 1/2013 | Matsumoto | B62J 99/00 73/865.4 |
| 2014/0060212 A1 | 3/2014 | Tetsuka et al. | |

FOREIGN PATENT DOCUMENTS

| | | |
|---|---|---|
| DE | 4435174 A1 | 3/1996 |
| DE | 69935750 T2 | 8/2007 |
| DE | 102009029633 A1 | 3/2011 |
| JP | 3047816 U | 2/1998 |
| JP | 2009-192385 A | 8/2009 |
| WO | 2011/030215 A1 | 3/2011 |
| WO | 2012/056522 A1 | 5/2012 |
| WO | 2012/056558 A1 | 5/2012 |
| WO | 2013/001746 A1 | 1/2013 |
| WO | 2013/017465 A2 | 2/2013 |

\* cited by examiner

*Primary Examiner* — Sisay Yacob
(74) *Attorney, Agent, or Firm* — Global IP Counselors (57) ABSTRACT

A pedaling state detecting apparatus is basically provided with a communication unit and a controller. The communication unit is configured to receive left and right crank arm data relating to a pedaling force applied to left and right crank arms. The controller is configured to output a non-visual notification command indicative of a left-right crank arm balance based on the left and right crank arm data received from the communication unit.

15 Claims, 7 Drawing Sheets

PEDALING STATE DETECTING APPARATUS

BACKGROUND

1. Field of the Invention

This invention generally relates to a pedaling state detecting apparatus for a bicycle. More specifically, the present invention relates a pedaling state detecting apparatus that notifies the rider of the balance of the left and right legs' status without having to look at a display on the bicycle when the rider riding the bicycle.

2. Background Information

Bicycles are sometimes equipped with various sensors for providing information to the rider about various aspects of the bicycle. One such sensor is a torque or force sensor for detecting a pedaling force of the rider. Various sensing arrangements have been proposed for detecting a pedaling force of the rider. For example, pedaling force measurement devices are in disclosed in U.S. Pat. No. 7,516,677 (assigned to Shimano Inc.), Japanese Utility Model Patent No. 3047816 (see FIGS. 3 and 4) and PCT International Publication No. WO/2011/030215. In a conventional pedaling force measurement device, parameters in the form of a vertical force component of the bending moment, a longitudinal force component of the bending moment, and the position of the pedal in the pedal axial direction acting on the crank arm are measured using a strain gauge. The measured parameters are displayed on a display device. For example, PCT International Publication No. WO2012/056522A1 and PCT International Publication No. WO2012/056558A1 each discloses a pedaling state detecting apparatus that has a display for displaying the pedaling state.

SUMMARY

Generally, the present disclosure is directed to various features of a pedaling state detecting apparatus for a bicycle. Usually, information about the pedaling state is displayed on a display device, which requires a rider to look at the display device to determine a pedaling state. Thus, in the prior art, when the rider wants information on the power balance between the left and right legs, the rider needs to watch the display of the display device.

In view of this situation, one aspect of the pedaling state detecting apparatus is to notify the rider of the balance of the left and right legs without having to look at a display on the bicycle when the rider riding the bicycle. In other words, it would be convenient if the rider can know the power balance without having to watch the display.

In view of the state of the known technology and in accordance with a first aspect of the present disclosure, a pedaling state detecting apparatus is provided that basically comprises a communication unit and a controller. The communication unit is configured to receive left and right crank arm data relating to a pedaling force applied to left and right crank arms. The controller is configured to output a non-visual notification command indicative of a left-right crank arm balance based on the left and right crank arm data received from the communication unit.

In accordance with a second aspect of the present invention, the pedaling state detecting apparatus according to the first aspect further comprises a notification producing device that is configured to produce a non-visual notification in accordance with the non-visual notification command.

In accordance with a third aspect of the present invention, the pedaling state detecting apparatus according to the second aspect is configured so that notification producing device produces sound as the non-visual notification.

In accordance with a fourth aspect of the present invention, the pedaling state detecting apparatus according to the second aspect is configured so that the notification producing device produces a haptic feedback as the non-visual notification.

In accordance with a fifth aspect of the present invention, the pedaling state detecting apparatus according to the second aspect is configured so that the controller is configured to wirelessly communicate with the notification producing device.

In accordance with a sixth aspect of the present invention, the pedaling state detecting apparatus according to the second aspect is configured so that the notification producing device is wired to the controller.

In accordance with a seventh aspect of the present invention, the pedaling state detecting apparatus according to the second aspect is configured so that the controller is further configured to control the notification producing device to output the non-visual notification by outputting once per one crank rotation a left crank arm notification corresponding to a left crank arm angle and a right crank arm notification corresponding to a right crank arm angle, the left crank arm angle and the right crank arm angle being the same angle for each of the left and right crank arms with respect to a center crank rotational axis.

In accordance with an eighth aspect of the present invention, the pedaling state detecting apparatus according to the seventh aspect is configured so that the controller is further configured to control the notification producing device to adjust an output intensity of the left crank arm notification in proportion to a left crank arm pedaling force and to adjust an output intensity of the right crank arm notification in proportion to a right crank arm pedaling force.

In accordance with a ninth aspect of the present invention, the pedaling state detecting apparatus according to the seventh aspect is configured so that the controller is configured to calculate a crank arm power balance as the left-right crank arm balance and to control the notification producing device to output the non-visual notification based on a difference between a left crank arm pedaling power and a right crank arm pedaling power.

In accordance with a tenth aspect of the present invention, the pedaling state detecting apparatus according to the seventh aspect is configured so that the controller is configured to calculate a pedaling efficiency balance as the left-right crank arm balance and to control the notification producing device to output the non-visual notification based on a difference between a left crank arm pedaling efficiency and a right crank arm pedaling efficiency.

In accordance with an eleventh aspect of the present invention, the pedaling state detecting apparatus according to the seventh aspect is configured so that the controller is configured to calculate a maximum tangential pedaling force balance as the left-right crank arm balance and to control the notification producing device to output the non-visual notification based on a difference between a left crank arm maximum tangential pedaling force and a right crank arm maximum tangential pedaling force.

In accordance with a twelfth aspect of the present invention, the pedaling state detecting apparatus according to the seventh aspect further comprises a user input interface operatively coupled to the controller to set the left and right crank arm angles between at least two different angles.

In accordance with a thirteenth aspect of the present invention, the pedaling state detecting apparatus according to the second aspect is configured so that the controller is further configured to control the notification producing device to output the non-visual notification by outputting either no notification or a first notification when the left-right crank arm balance is within a predetermined range, and by outputting a second notification that is different from the first notification when the left-right crank arm balance indicates an imbalance that is greater than a predetermined value.

In accordance with a fourteenth aspect of the present invention, the pedaling state detecting apparatus according to the thirteenth aspect is configured so that the controller is configured to calculate a crank arm power balance as the left-right crank arm balance and to control the notification producing device to output the non-visual notification based on a difference between a left crank arm pedaling power and a right crank arm pedaling power.

In accordance with a fifteenth aspect of the present invention, the pedaling state detecting apparatus according to the thirteenth aspect is configured so that the controller is configured to calculate a pedaling efficiency balance as the left-right crank arm balance and to control the notification producing device to output the non-visual notification based on a difference between a left crank arm pedaling efficiency and a right crank arm pedaling efficiency.

In accordance with a sixteenth aspect of the present invention, the pedaling state detecting apparatus according to the thirteenth aspect is configured so that the controller is configured to calculate a maximum tangential pedaling force balance as the left-right crank arm balance and to control the notification producing device to output the non-visual notification based on a difference between a left crank arm maximum tangential pedaling force and a right crank arm maximum tangential pedaling force.

Also other objects, features, aspects and advantages of the disclosed pedaling state detecting apparatus will become apparent to those skilled in the art from the following detailed description, which, taken in conjunction with the annexed drawings, discloses selected embodiments of the pedaling state detecting apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
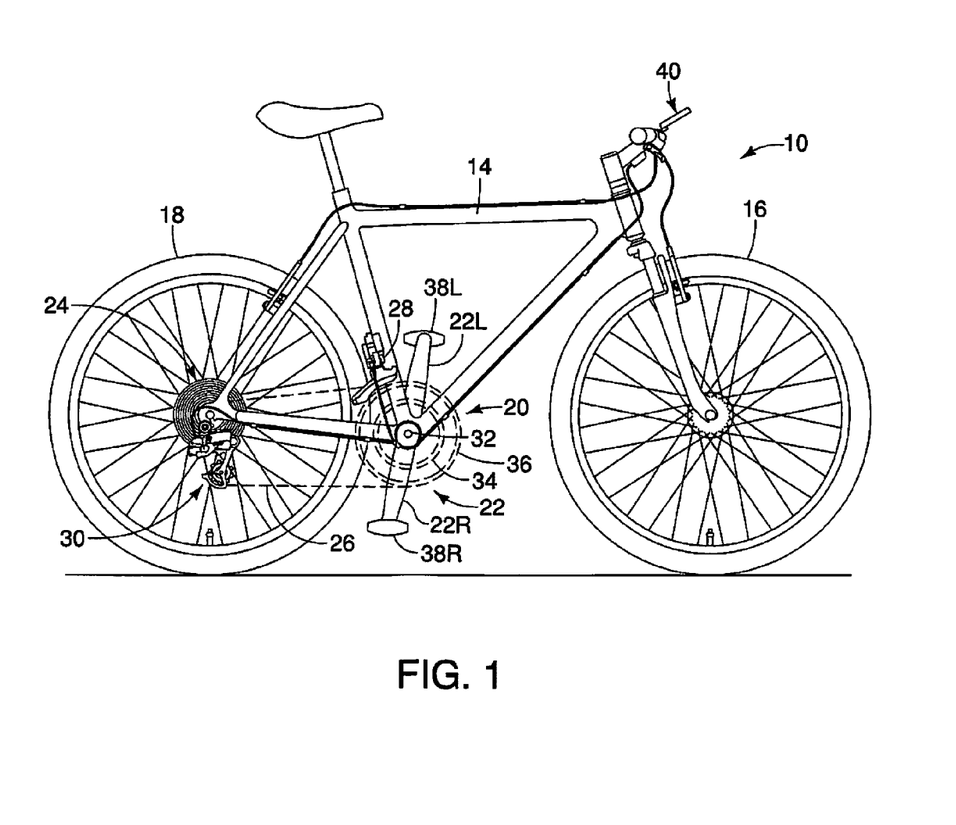
FIG. 1 is a side elevational view of a bicycle that is equipped with a pedaling state detecting apparatus in accordance with one illustrated embodiment.

Referring initially to FIG. 1, a bicycle 10 is illustrated that is equipped with a pedaling state detecting apparatus 12 in accordance with one illustrative embodiment. While the bicycle 10 is illustrated as a mountain bike, the bicycle shift notification can be used with other types of bicycle as needed and/or desired. In particular, the pedaling state detecting apparatus 12 can be installed on both moving bicycles that advance when a rider pedals and stationary bicycles, such as exercise bicycles.

The bicycle 10 and its various parts are conventional, except for components of the pedaling state detecting apparatus 12 as discussed herein. Thus, the bicycle 10 and its various parts will not be discussed and/or illustrated in detail herein, except as needed to understand the pedaling state detecting apparatus 12. As seen in FIG. 1, the bicycle 10 basically has a bicycle frame 14 having a front wheel 16, a rear wheel 18 and a drive train 20. The drive train 20 basically includes a front crank assembly 22, a rear cassette 24 and a chain 26. The bicycle frame 14 is also provided with a front derailleur 28 and a rear derailleur 30 for shifting the chain 26 to change speeds of the drive train 20. The front crank assembly 22 includes a first (left) bicycle crank arm 22L, a second (right) crank arm 22R and a crank axle 32. The first and second crank arms 22L and 22R are fixedly coupled to the crank axle 32 such that the first and second crank arms 22L and 22R extend perpendicularly from the crank axle 32 in opposite directions. In the illustrated embodiment, the second crank arm 22R has a pair of sprockets 34 and 36. The free ends of the first and second crank arm arms 22L and 22R are provided with bicycle pedals 38L and 38R, respectively. A rider applies a pedaling force on the bicycle pedals 38L and 38R. This pedaling force is then transmitted to the first and second crank arms 22L and 22R for rotating the sprockets 34 and 36 and moving the bicycle chain 26 to propel the bicycle 10 in a conventional manner.

Referring to FIG. 1, the pedaling state detecting apparatus 12 includes a cycle computer 40 that wirelessly communicates with the front crank assembly 22 for notifying a rider of the pedaling state of the front crank assembly 22. In particular, the cycle computer 30 of the pedaling state detecting apparatus 12 comprises a communication unit 42 (wireless transmitter) and a controller 44. While the communication unit 42 and the controller 44 are illustrated as a part of the cycle computer 40, the communication unit 42 and the controller 44 can be provided separately from the cycle computer 40. Also alternatively, the communication unit 42 can be connected to the cycle computer 30 by one or more electrical cords.

As understood in the art, the controller 44 is a microcomputer that includes a central processing unit (CPU) and other conventional components such as an input interface circuit, an output interface circuit, and storage devices such as a ROM (Read Only Memory) device and a RAM (Random Access Memory) device. The controller 44 is programmed to determine a pedaling power balance based on left and right crank arm data received from the communication unit 42. The controller 44 can also be provided with various other control programs that perform various bicycle control operations as needed and/or desired. It will be apparent to those skilled in the art from this disclosure that the precise structure and algorithms for the controller 44 can be any combination of hardware and software that will carry out the notification functions as discussed herein.

The controller 44 can be programmed (pre-stored programs) to calculate the force or power applied to the first and second crank arms 22L and 22R in a well-known manner based on the left and right crank arm data (signals) received from the communication unit 42. Alternatively, the calculation of the force or power applied to the first and second crank arms 22L and 22R and the comparison of the left crank arm pedaling force to the right crank arm pedaling force can be calculated remotely such as by one or more processors located in the front crank assembly 22. The power exerted by the rider to the pedals 38L and 38R can be calculated by, for example, using the following equation (1) shown below based on a torque acting on the first and second crank arms 22L and 22R and the cadence of the first and second crank arms 22L and 22R.

$$\text{Power(W)} = \text{Torque(N·m)} \times \text{Cadence(rpm)} \times 2\pi/60 \qquad (1)$$

In any case, basically, the communication unit 42 is configured to receive left and right crank arm data relating to a pedaling force applied the left and right crank arms 22L and 22R. Then, based on the left and right crank arm data that was received, the controller 44 notifying a rider of the pedaling state of the front crank assembly 22 in such a manner that the rider can recognize the difference in the pedaling forces that are applied to the first and second crank arms 22L and 22R as explained below. As explained below, the pedaling state detecting apparatus 12 provides the rider with a non-visual notification that is indicative of a left-right crank arm balance of the first and second crank arms 22L and 22R based on the left and right crank arm data received from the communication unit 42.

The controller 44 is programmed to provide this non-visual notification to the rider in a variety of ways such as auditorily and/or haptically. Moreover, the controller 44 is programmed to selectively also provide a visual report of the pedaling state. As explained later, the notifications are preferably settable by the rider and/or other users such that the type (sound, light, vibration, etc.) of the notification(s) can be adjusted as well as the predetermined condition for triggering the notification point(s). More specifically, the controller 44 is configured to output a non-visual notification command indicative of a left-right crank arm balance based on the left and right crank arm data received from the communication unit 42. Typically, the controller 44 outputs the non-visual notification once per one rotation of the each of the first and second crank arms 22L and 22R. In other words, a first or left crank arm notification is outputted for each rotation of the first (left) crank arm 22L and a right or second crank arm notification is outputted for each rotation of the second (right) crank arm 22R.

Preferably, the pedaling state detecting apparatus 12 further comprises a first notification producing device 46 that is configured to produce a non-visual notification in accordance with the non-visual notification command. Here, as seen in FIG. 3, the notification producing device 46 is a speaker or other sound producing device that is disposed within the housing of the cycle computer 40. In other words, the first notification producing device 46 produces sound as the non-visual notification. In the illustrated embodiment, the controller 44 and the notification producing device 46 (e.g., a speaker) are preferably provided on a single printed circuit board. Thus, the notification producing device 46 is wired to the controller 44 as diagrammatically illustrated in FIG. 2.

Figure 2:
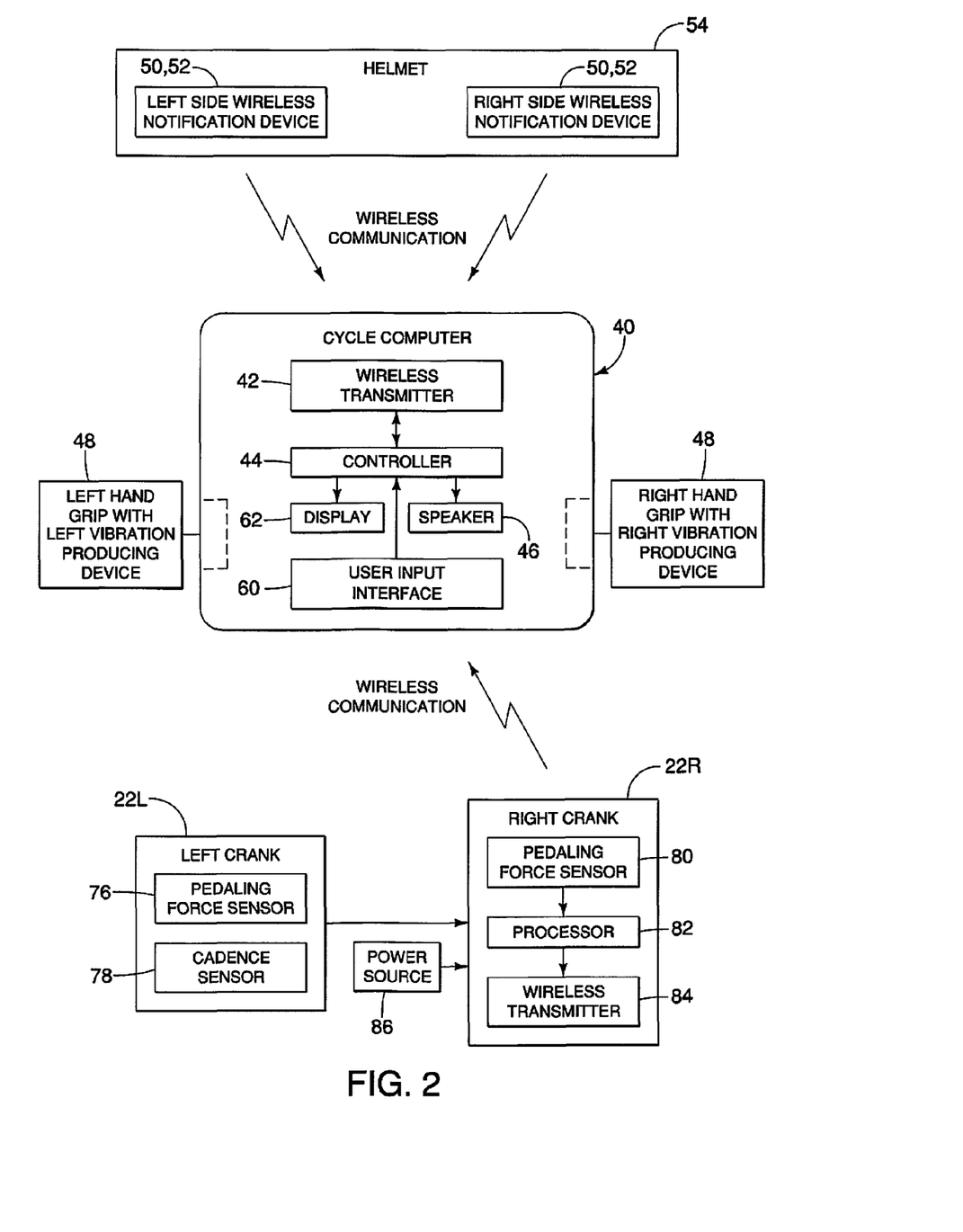
FIG. 2 is a schematic block diagram showing an overall configuration of the pedaling state detecting apparatus illustrated in FIG. 1.
Figure 3:
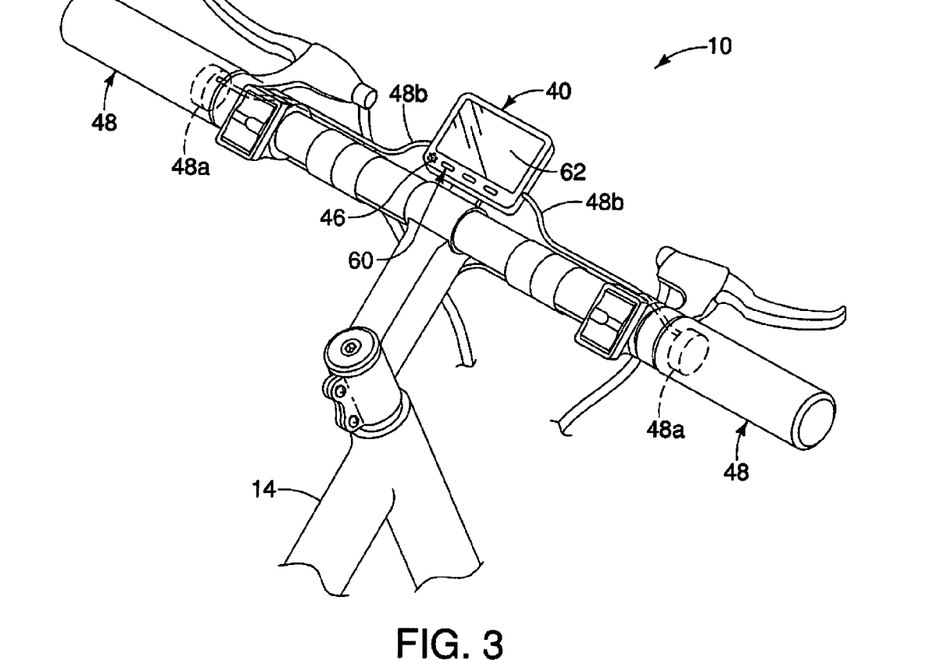
FIG. 3 is a perspective view of a handlebar area of the bicycle illustrated in FIG. 1 with the cycling computer including a sound (audio) producing device and a pair of hand grips that each includes a vibration (haptic) producing device.

Preferably, as seen in FIGS. 2 and 3, the pedaling state detecting apparatus 12 further comprises a pair of second notification producing devices 48 that are configured to produce non-visual notifications in accordance with the non-visual notification command. Here, in the illustrated embodiment, the second notification producing devices 48 are hand grips that each includes a vibrating part 48a. In other words, the second notification producing devices 48 produce haptic feedback as the non-visual notification, by providing the second notification producing devices 48 on opposite sides of the handlebar, the notification producing device 48 that is on the left side of the handlebar can produce the notification that corresponds to the pedaling force applied to the left crank arm 22L, and the notification producing device 48 that is on the right side of the handlebar can produce the notification that corresponds to the pedaling force applied to the right crank arm 22R. Here, the notification producing devices 48 are wired to the controller 44 by wires 48b as seen in FIG. 3.

Figure 4:
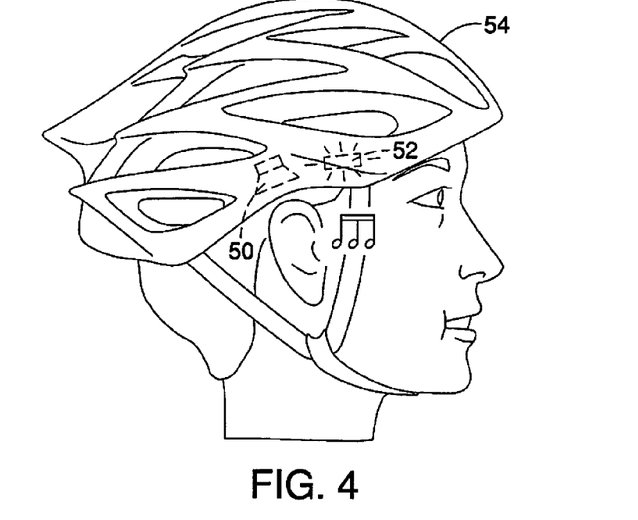
FIG. 4 is a side elevational view of a bicycle helmet including at least one of vibration (haptic) producing device and a sound (audio) producing device.

Optionally, as seen in FIGS. 2 and 4, the pedaling state detecting apparatus 12 further comprises one or more remotely located notification producing devices 50 and 52 that are configured to produce non-visual notifications in accordance with the non-visual notification command. Here, the notification producing devices 50 and 52 are provided in a bicycle helmet 54. Each of the notification producing devices 50 and 52 has a built-in wireless transmitter so that they can wirelessly communicate with the cycle computer 40. In other words, the controller 44 is configured to wirelessly communicate with the notification producing devices 50 and 52 via the communication unit 42. The notification producing devices 50 and 52 are illustrated as a speaker and a vibration part, respectively. As diagrammatically illustrated in FIG. 2, the notification producing devices 50 and 52 are both located on the left and right sides of the helmet 54. In this way, the notification producing devices 50 and 52 on the left side of the helmet 54 can produce the notification that corresponds to the pedaling force applied to the left crank arm 22L, and the notification producing devices 50 and 52 on the right side of the helmet 54 can produce the notification that corresponds to the pedaling force applied to the right crank arm 22R.

The controller 44 is further configured to control one or more of the notification producing devices 46, 48, 50 and 52 to output the non-visual notification by outputting once per one crank rotation a left crank arm notification corresponding to a left crank arm angle and a right crank arm notification corresponding to a right crank arm angle. In other words, for each 360° of rotation of the first (left) crank arm 22L, the left crank arm notification is outputted each time at the same point in the rotation of the first (left) crank arm 22, and for each 360° of rotation of the second (right) crank arm 22R, the right crank arm notification is outputted each time at the same point in the rotation of the second (right) crank arm 22R. Preferably, the left crank arm angle for outputting the left crank arm notification and the right crank arm angle for outputting the right crank arm notification are the same angle for each of the left and right crank arms 22L and 22R with respect to a center crank rotational axis of the crank axle 32.

As seen in FIGS. 2 and 3, preferably, the pedaling state detecting apparatus 12 further comprises a user input interface 60 that is operatively coupled to the controller 44 to set various operating parameters of the pedaling state detecting apparatus 12. In the illustrated embodiment, the user input interface 60 is formed by three push buttons that are provided to the housing of the cycle computer 40. However, a variety of user input interfaces can be used as needed and/or desired. Preferably, the pedaling state detecting apparatus 12 further comprises a display unit 62, e.g., an LCD display. In the illustrated embodiment, the user input interface 60 and the display unit 62 are integrated into the cycle computer 40. However, the user input interface 60 and the display unit 62 can be separate from the cycle computer 40. For example, a personal computer or laptop computer may be used for setting parameters of the pedaling state detecting apparatus 12 and for displaying setup screens to instruct a user in setting the parameters of the pedaling state detecting apparatus 12.

Preferably, by using the user input interface 60, the controller 44 is configured such that the user can set the left crank arm notification and the right crank arm notification in such a way to aid the rider in determining the level of the pedaling force of each of the left and right crank arms 22L and 22R. For example, in the illustrated embodiment, the controller 44 is further configured to control one or more of the notification producing devices 46, 48, 50 and 52 to adjust an output intensity of the left crank arm notification in proportion to a left crank arm pedaling force and to adjust an output intensity of the right crank arm notification in proportion to a right crank arm pedaling force. Thus, the rider can know the difference between the power balance of the left and right leg by hearing the sound level and/or feeling the vibration level.

In the case, that only a single notification producing device, such as only the notification producing device 46, is used to produce both the left and right crank arm notifications, the rider can listen to the alternating notifications to determine the level of the pedaling force of each of the left and right crank arms 22L and 22R. Thus, it is advantageous to provide two separate notification producing device that are spaced apart to aid the rider in differentiating between the left and right crank arm notifications. However, it is less expensive if only one notification producing device is used. Of course, optionally, by using the user input interface 60, the user can select different sounds or vibrations for the left and right crank arm notifications. For example, the left crank arm notification could have a first sound pitch, while the right crank arm notification could have a second sound pitch that is higher or lower than the first sound pitch.

Preferably, by using the user input interface 60, the controller 44 is configured such that the user can set the basis for the non-visual notification of the left-right crank arm balance. For example, in the illustrated embodiment, the controller 44 is configured to calculate a crank arm power balance as the left-right crank arm balance and to control one or more of the notification producing devices 46, 48, 50 and 52 to output the non-visual notification based on a difference between a left crank arm pedaling power and a right crank arm pedaling power. In other words, the controller 44 can be manually set to calculate the left crank arm pedaling power and the right crank arm pedaling power to determine the crank arm power balance (i.e., the difference between the left crank arm pedaling power and the right crank arm pedaling power.

Alternatively, in the illustrated embodiment, the user can set the controller 44 such that the controller 44 is configured to calculate a pedaling efficiency balance as the left-right crank arm balance and to control one or more of the notification producing devices 46, 48, 50 and 52 to output the non-visual notification based on a difference between a left crank arm pedaling efficiency and a right crank arm pedaling efficiency. In this way, the non-visual notification can be adjusted to indicate the rider the difference between the pedaling efficiencies of the left and right crank arms 22L and 22R.

Also alternatively, in the illustrated embodiment, the user can set the controller 44 such that the controller 44 is configured to calculate a maximum tangential pedaling force balance as the left-right crank arm balance and to control one or more of the notification producing devices 46, 48, 50 and 52 to output the non-visual notification based on a difference between a left crank arm maximum tangential pedaling force and a right crank arm maximum tangential pedaling force. In this way, the non-visual notification can be adjusted to indicate the rider the difference between the maximum tangential pedaling forces of the left and right crank arms 22L and 22R.

Preferably, by using the user input interface 60, the controller 44 is configured such that the user can set the non-visual notification in such a way to aid the rider in determining if an imbalance exists between the pedaling forces of the left and right crank arms 22L and 22R, preferably, the controller 44 is further configured to control one or more of the notification producing devices 46, 48, 50 and 52 to output the non-visual notification by outputting either no notification or a first notification when the left-right crank arm balance is within a predetermined range, and by outputting a second notification that is different from the first notification when the left-right crank arm balance indicates an imbalance that is greater than a predetermined value. In other words, when the difference pedaling forces of the left and right crank arms 22L and 22R is within a first predetermined valve, the notification producing devices 46, 48, 50 and 52 are all inactive or a first non-visual notification is outputted by one or more of the notification producing devices 46, 48, 50 and 52. Then when the difference pedaling forces of the left and right crank arms 22L and 22R is above the first predetermined valve, but equal to or smaller than a second predetermined valve, a second non-visual notification is outputted by one or more of the notification producing devices 46, 48, 50 and 52. Then when the difference pedaling forces of the left and right crank arms 22L and 22R is above the second predetermined valve, a third non-visual notification is outputted by one or more of the notification producing devices 46, 48, 50 and 52. In this way, the rider will know when the pedaling forces of the left and right crank arms 22L and 22R are nearly equal (i.e., within the first predetermined range) and/or the magnitude of the imbalance (i.e., above the second predetermined range or the third predetermined range).

Preferable, the predetermined ranges are user settable parameters. Preferably, the type(s) of notification(s) for each of the first, second and third non-visual notifications are user settable parameters. For example, the first, second and third non-visual notifications can all be different distinguishable sounds, or each of the first, second and third non-visual notifications can be a different type of notifications. For example, the first non-visual notification could be only sound, while the second non-visual notification could be only vibration and the third non-visual notification could be both sound and vibration.

Figure 5:
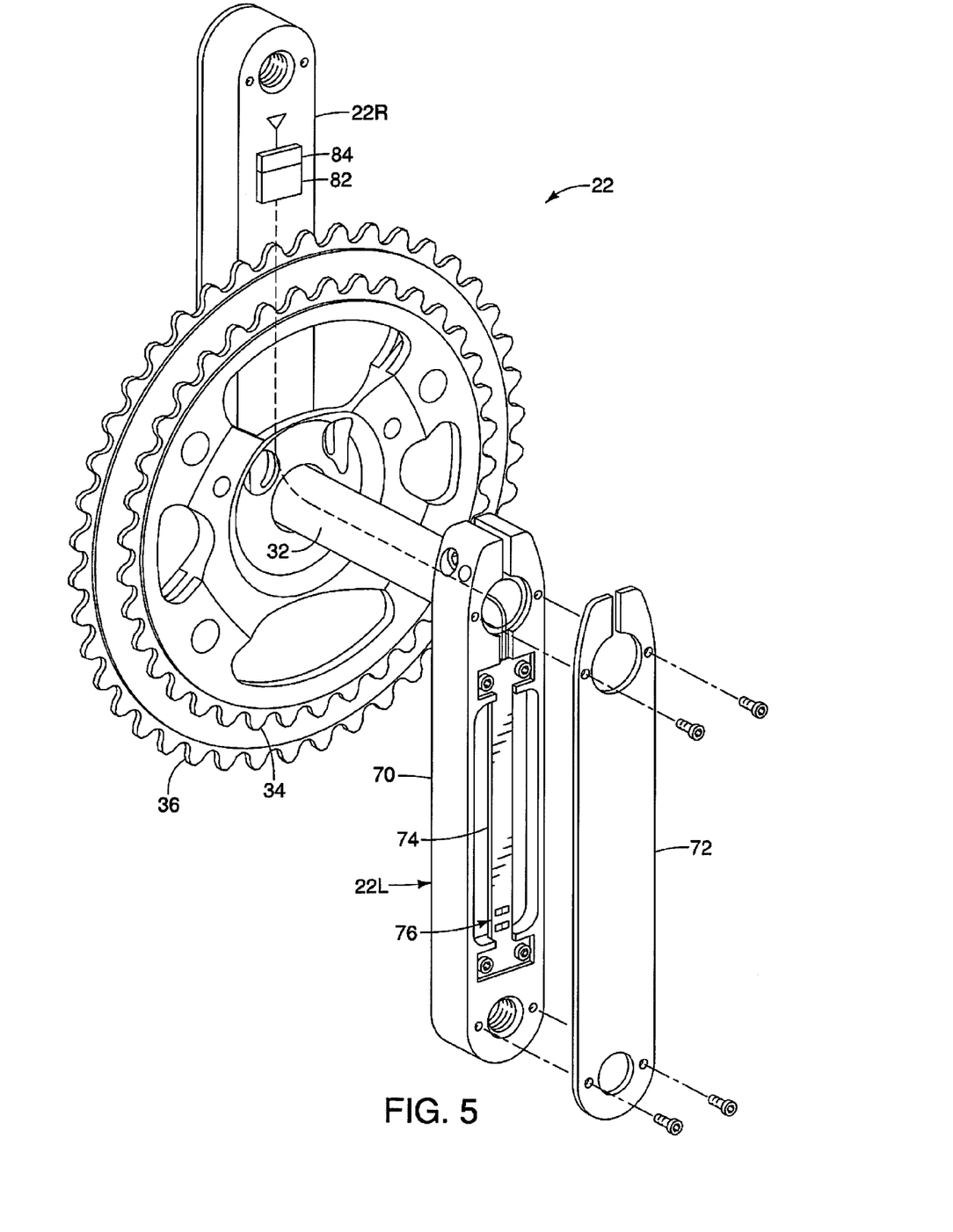
FIG. 5 is a perspective view of the crank assembly of the pedaling state detecting apparatus in accordance with the illustrated embodiment.

Referring now to FIGS. 2 and 5, the front crank assembly 22 will now be discussed in further detail. As seen in FIG. 5, the first (left) crank arm 22L includes a main arm member 70 and a cover member 72. Inside a recess of the main arm member 70 is a strain-flexing part 74 that includes a pedaling force sensor 76. In the illustrated embodiment, the pedaling force sensor 76 includes a plurality of strain sensors that are configured and arranged in the manner as the parameter detection part that is disclosed in U.S. Patent Application Publication No. 2014/0060212. However, the pedaling force sensor 76 is not limited to this arrangement. Rather, any pedaling force sensing arrangement can be used as needed and/or desired.

Preferably, as seen in FIG. 2, the first (left) crank arm 22L also includes a cadence sensor 78 for measuring the rotational speed of the first crank arm 22L. The cadence sensor 78 is preferably mounted on a surface of the first crank arm 22L that faces the frame 14. For example, the cadence sensor 78 is a magnetically operated reed switch that detects at least one magnet (not shown) mounted on the frame 14 or other part that is stationary with respect to the frame. For example, the cadence sensor 78 faces at least one magnet that is provided on the hanger tube of the frame 14.

As seen in FIG. 2, the second (right) crank arm 22R includes a pedaling force sensor 80, a processor 82 and a wireless transmitter or communication unit 84. In the illustrated embodiment, the pedaling force sensor 80 is the same as the pedaling force sensor 76 of the first (left) crank arm 22L. Thus, the second (right) crank arm 22R has a strain-flexing part (not shown) that supports the pedaling force sensor 80 in the same manner as in the first (left) crank arm 22L. The processor 82 electrically connected to the pedaling force sensors 76 and 80 and the cadence sensor 78 for processing the left and right crank arm data (signals) received from the pedaling force sensors 76 and 80 and the cadence sensor 78 as needed and/or desired. Of course, all processing of the left and right crank arm data can be performed by the controller 44 as needed and or desired. If the processing the left and right crank arm data is performed by the controller 44, then the processor 82 can be eliminated.

The communication unit 84 is configured to wirelessly transmit the left and right crank arm data to the communication unit 42 of the cycle computer. Alternatively, the communication units 82 and 84 can be electrically connected by an electrical cord or the like. As seen in FIG. 2, a power supply 86 is electrically connected to the processor 82 and the communication unit 84. This power supply 86 can be provided within the crank axle 32. The power supply 86 can be, for example, a rechargeable battery such as nickel hydride cell or a lithium ion cell that is recharged by a generator on the bicycle 10. Alternatively, the power supply 86 can be, for example, a disposable battery.

Figure 6:
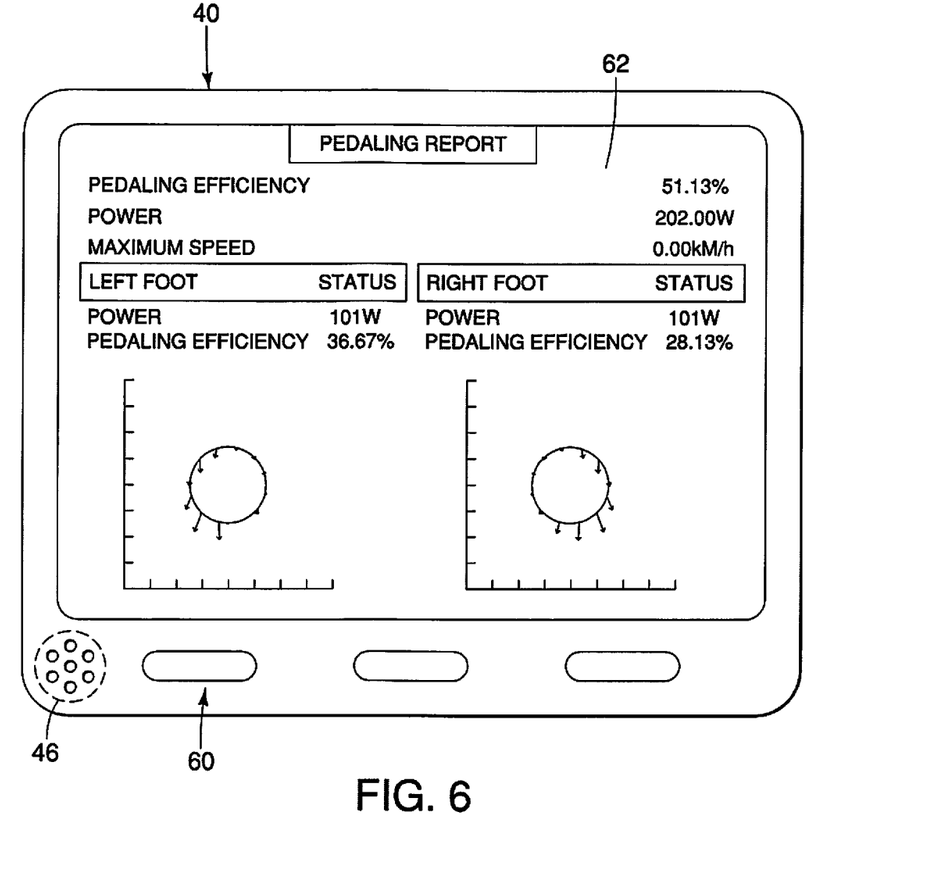
FIG. 6 is an enlarged top plan view of the cycle computer with the display screen displaying a pedaling report generated by the pedaling state detecting apparatus.

Referring now to FIGS. 6 to 10, various screen displays of the display unit 62 are illustrated. FIG. 6 illustrates an exemplary pedaling report having various data calculated by the controller 44 and relating to the pedaling force applied to the first and second crank arms 22L and 22R. In this report, the controller 44 displays some information such as pedaling power, maximum pedaling speed, pedaling efficiency, speed, left leg pedaling status and right leg pedaling status. Of course, the pedaling report feature is optional, since a non-visual notification is prefer in the pedaling state detecting apparatus 12. Also, the controller 44 can be programmed to perform other control functions such as automatic shifting of the derailleurs 28 and 30.

Referring to FIGS. 7 to 10, these screen displays of the display unit 62 are selectively generated by a program that is pre-stored in the controller 44. Using the user input interface 60, the user (e.g., the rider) can set various parameters for producing the non-visual notification commands for controlling one or more of the notification producing devices 46, 48, 50 and 52.

Figure 7:
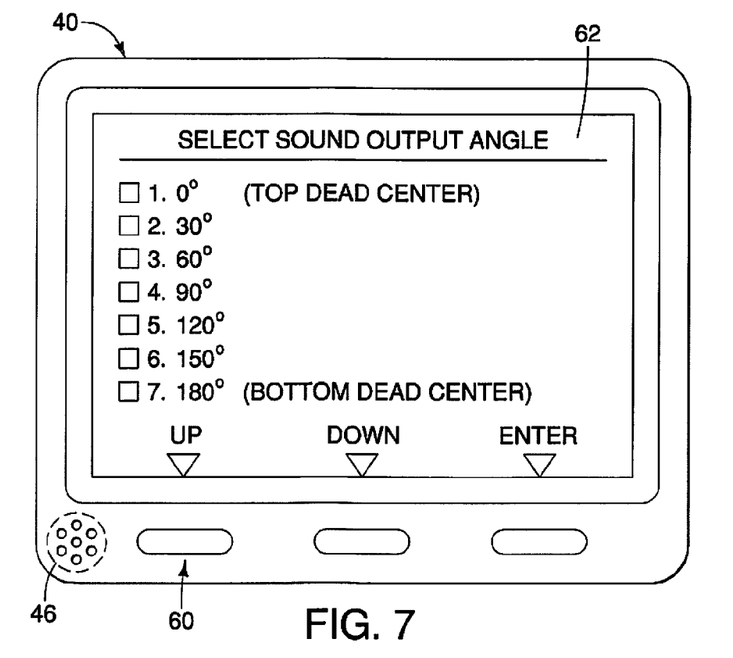
FIG. 7 is an enlarged top plan view of the cycle computer with the display screen displaying a set up screen generated by the pedaling state detecting apparatus for manually setting sound output angles for outputting a notification in accordance with an angular position of the left and right crank arms.

For example, FIG. 7 illustrates a screen used by the controller 44 for permitting a user to set an output timing outputs the notifications that are indicative of the pedaling power balance of the left and right legs. In other words, by using the user input interface 60, the controller 44 permits a user to set the non-visual notifications (e.g., the sound or vibration output points or angles) with respect to an angular position of the left and right crank arms 22L and 22R relative to the center axis of rotation of the crank axle 32. While various angular degrees are indicated as selectable output points or angles, the output points or angles can be set based on the torque level (i.ie, top dead angle, maximum torque angle, etc.) of the left and right crank arms 22L and 22R.

Figure 8:
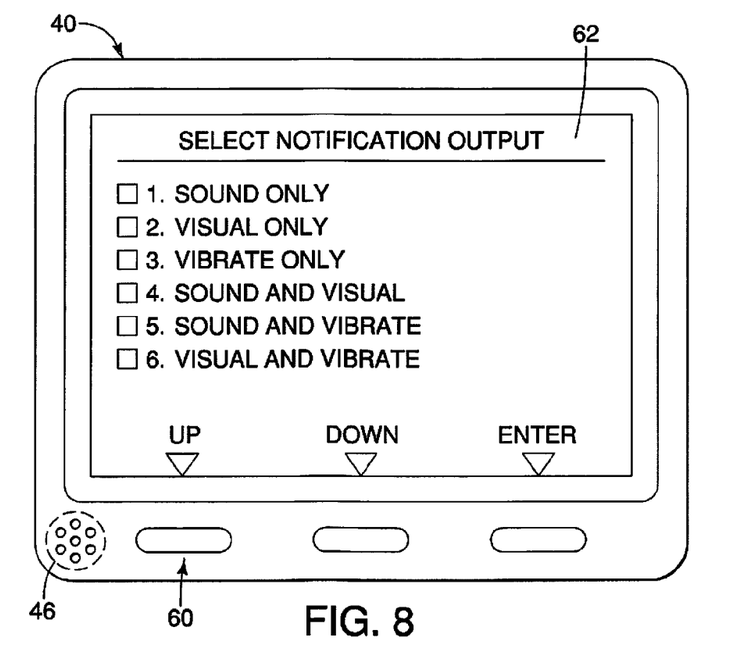
FIG. 8 is an enlarged top plan view of the cycle computer with the display screen displaying a set up screen generated by the pedaling state detecting apparatus for manually setting certain output parameters of the pedaling state detecting apparatus.

FIG. 8 illustrates a screen for setting how the pedaling power balance notification is to be presented to the rider, e.g., auditorily, haptically and/or visually. Thus, the pedaling power balance notification is preferably settable by the rider and/or other users such that the type (sound, light, vibration, etc.) of the notification(s) can be adjusted. By using the auditorily and/or haptically notification settings, the rider can know the pedaling power balance of the left and right legs without having to watch the display unit 62 on the bicycle 10 when the rider is riding the bicycle 10.

Figure 9:
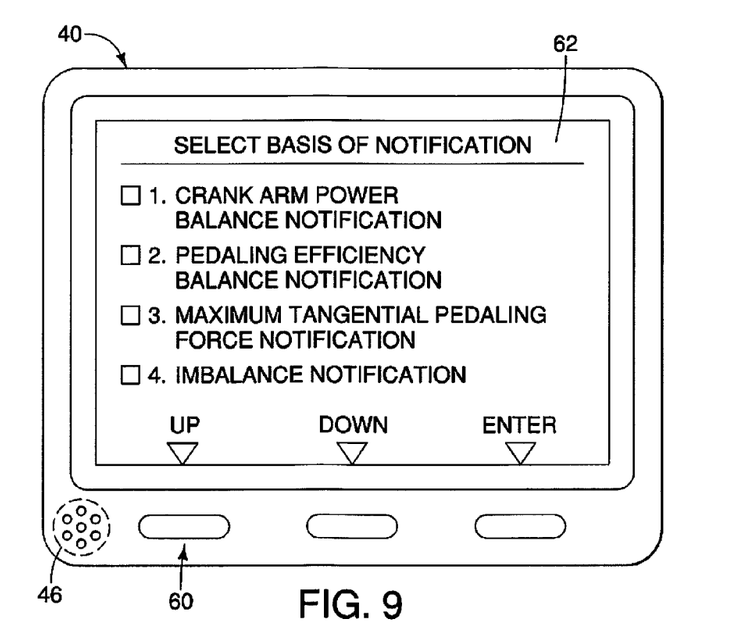
FIG. 9 is an enlarged top plan view of the cycle computer with the display screen displaying a set up screen generated by the pedaling state detecting apparatus for manually setting the basis of the notification for indicating the left and right crank arm balance.
Figure 10:
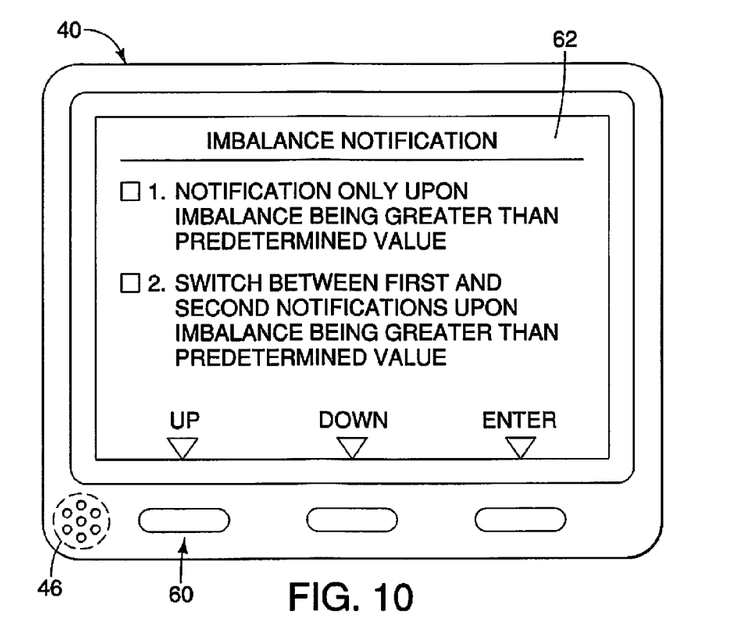
FIG. 10 is an enlarged top plan view of the cycle computer with the display screen displaying a set up screen generated by the pedaling state detecting apparatus for manually setting the type of notification for an imbalance.

FIG. 9 illustrates a screen for setting the basis of the notification(s) for indicating the left and right crank arm balance. For example, by using the user input interface 60, the controller 44 permits a user to select the basis of the notification(s) from anyone of a crank arm power balance notification, a pedaling efficiency balance notification, a maximum tangential pedaling force notification and an imbalance notification. Each basis of the notification(s) is discussed above. For each of these selections, the user may be presented with one or more additional screens for selecting additional options. For example, if the imbalance notification is selected by the user, then the screen shown in FIG. 10 is presented to the user to select the type of notification for the imbalance in the pedaling force.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended functions. Components that are shown directly connected or contacting each other can have intermediate structures disposed between them so long as the changes do not substantially affect their intended functions. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein to describe the above embodiment(s), the following directional terms "forward", "rearward", "above", "downward", "vertical", "horizontal", "below" and "transverse" as well as any other similar directional terms refer to those directions of a bicycle equipped with the pedaling state detecting apparatus. Accordingly, these terms, as utilized to describe the pedaling state detecting apparatus should be interpreted relative to a bicycle equipped with the pedaling state detecting apparatus as used in the normal riding position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A pedaling state detecting apparatus comprising:
a communication unit configured to receive left and right crank arm data relating to a pedaling force applied to left and right crank arms;
a controller configured to output a non-visual notification command indicative of a left-right crank arm balance based on the left and right crank arm data received from the communication unit; and
a notification producing device configured to produce a non-visual notification in accordance with the non-visual notification command, the controller being further configured to control the notification producing device to output the non-visual notification by outputting once per one crank rotation a left crank arm notification corresponding to a left crank arm angle and a right crank arm notification corresponding to a right crank arm angle, the left crank arm angle and the right crank arm angle being the same angle for each of the left and right crank arms with respect to a center crank rotational axis.

2. The pedaling state detecting apparatus according to claim 1, wherein
the notification producing device produces sound as the non-visual notification.

3. The pedaling state detecting apparatus according to claim 1, wherein
the notification producing device produces a haptic feedback as the non-visual notification.

4. The pedaling state detecting apparatus according to claim 1, wherein
the controller is configured to wirelessly communicate with the notification producing device.

5. The pedaling state detecting apparatus according to claim 1, wherein
the notification producing device is wired to the controller.

6. The pedaling state detecting apparatus according to claim 1, wherein
the controller is further configured to control the notification producing device to adjust an output intensity of the left crank arm notification in proportion to a left crank arm pedaling force and to adjust an output intensity of the right crank arm notification in proportion to a right crank arm pedaling force.

7. The pedaling state detecting apparatus according to claim 1, wherein
the controller is configured to calculate a crank arm power balance as the left-right crank arm balance and to control the notification producing device to output the non-visual notification based on a difference between a left crank arm pedaling power and a right crank arm pedaling power.

8. The pedaling state detecting apparatus according to claim 1, wherein
the controller is configured to calculate a pedaling efficiency balance as the left-right crank arm balance and to control the notification producing device to output the non-visual notification based on a difference between a left crank arm pedaling efficiency and a right crank arm pedaling efficiency.

9. The pedaling state detecting apparatus according to claim 1, wherein
the controller is configured to calculate a maximum tangential pedaling force balance as the left-right crank arm balance and to control the notification producing device to output the non-visual notification based on a difference between a left crank arm maximum tangential pedaling force and a right crank arm maximum tangential pedaling force.

10. The pedaling state detecting apparatus according to claim 1, further comprising
a user input interface operatively coupled to the controller to set the left and right crank arm angles between at least two different angles.

11. The pedaling state detecting apparatus according to claim 1, wherein
the notification producing device is one of a pair of notification producing devices, each notification producing device being configured to transmit a non-visual notification in accordance with the non-visual notification command corresponding to the pedaling force applied to one of the left and right crank arms.

12. A pedaling state detecting apparatus comprising:
a communication unit configured to receive left and right crank arm data relating to a pedaling force applied to left and right crank arms;
a controller configured to output a non-visual notification command indicative of a left-right crank arm balance based on the left and right crank arm data received from the communication unit; and a notification producing device configured to produce a non-visual notification in accordance with the non-visual notification command, the controller being further configured to control the notification producing device to output the non-visual notification by outputting either no notification or a first notification when the left-right crank arm balance is within a predetermined range, and by outputting a second notification that is different from the first notification when the left-right crank arm balance indicates an imbalance that is greater than a predetermined value.

13. The pedaling state detecting apparatus according to claim 12, wherein the controller is configured to calculate a crank arm power balance as the left-right crank arm balance and to control the notification producing device to output the non-visual notification based on a difference between a left crank arm pedaling power and a right crank arm pedaling power.

14. The pedaling state detecting apparatus according to claim 12, wherein the controller is configured to calculate a pedaling efficiency balance as the left-right crank arm balance and to control the notification producing device to output the non-visual notification based on a difference between a left crank arm pedaling efficiency and a right crank arm pedaling efficiency.

15. The pedaling state detecting apparatus according to claim 12, wherein the controller is configured to calculate a maximum tangential pedaling force balance as the left-right crank arm balance and to control the notification producing device to output the non-visual notification based on a difference between a left crank arm maximum tangential pedaling force and a right crank arm maximum tangential pedaling force.

* * * * *